(12) United States Patent
Pchelnikov et al.

(10) Patent No.: US 7,216,054 B1
(45) Date of Patent: May 8, 2007

(54) ELECTROMAGNETIC METHOD AND APPARATUS FOR THE MEASUREMENT OF LINEAR POSITION

(75) Inventors: Yuriy Nikitich Pchelnikov, Cary, NC (US); David Scott Nyce, Apex, NC (US)

(73) Assignee: David S. Nyce, Apex, NC (US)

( * ) Notice: Subject to any disclaimer, the term of this patent is extended or adjusted under 35 U.S.C. 154(b) by 31 days.

(21) Appl. No.: 11/253,315

(22) Filed: Oct. 19, 2005

(51) Int. Cl.
*G01C 17/28* (2006.01)

(52) U.S. Cl. .................. 702/150; 73/488; 324/207.16; 335/256

(58) Field of Classification Search .................. 702/69, 702/95, 150, 152, 153, 155, 190; 324/201.13, 324/207.16, 207.25, 664; 73/290 R, 488; 335/256
See application file for complete search history.

(56) References Cited

U.S. PATENT DOCUMENTS

| | | | | |
|---|---|---|---|---|
| 3,458,808 A | * | 7/1969 | Agdur | 324/633 |
| 5,670,886 A | * | 9/1997 | Wolff et al. | 324/644 |
| 6,293,142 B1 | * | 9/2001 | Pchelnikov et al. | 73/290 R |
| 6,393,912 B2 | * | 5/2002 | Pchelnikov et al. | 73/488 |
| 6,819,208 B1 | * | 11/2004 | Peghaire et al. | 335/256 |
| 6,828,780 B2 | * | 12/2004 | Jagiella et al. | 324/207.16 |
| 6,912,475 B2 | * | 6/2005 | Moriya et al. | 702/150 |

* cited by examiner

*Primary Examiner*—Michael Nghiem
*Assistant Examiner*—John Le

(57) ABSTRACT

A method and apparatus are disclosed for monitoring a linear position, such as the distance between a sensing element and a movable object, and/or related parameters, such as displacement, direction, speed, velocity, and/or acceleration. The method utilizes a sensing element and an electrically conductive portion of the movable object, or a conductive target coupled to the movable object. The apparatus includes at least one sensing element formed by a section of a coupled slow-wave structure. The sensing element is connected to an RF or microwave generator, and an electronic circuit that converts at least one electromagnetic parameter of the section of the coupled slow-wave structure into a position reading. Electric and magnetic fields excited in the sensing element are split so that most of the electric energy is concentrated inside of the sensing element, while most of the magnetic energy is concentrated outside of the sensing element. The distance that defines the linear position is measured as a resonant frequency, impedance, phase shift or other electromagnetic parameter.

11 Claims, 8 Drawing Sheets

ELECTROMAGNETIC METHOD AND APPARATUS FOR THE MEASUREMENT OF LINEAR POSITION

FIELD OF THE INVENTION

The present invention relates to the measurement of linear position, more specifically, to an electromagnetic method and apparatus for measuring linear position, and related motion parameters. The related motion parameters including displacement, direction, speed, velocity, or acceleration.

BACKGROUND OF THE INVENTION

The usefulness of an RF (radio frequency) or microwave electromagnetic field for the purpose of linear position measurement is recognized in Prior Art Such devices can operate with either an RF or microwave excitation. When an electromagnetic field is excited near a movable object, the parameters of the electromagnetic field, such as resonant frequency, phase or amplitude, vary with the change of position of the movable object. The electromagnetic field parameters may be converted into an electronic indication of position, displacement, velocity, or acceleration of the movable object. In particular, the state of the art is shown in U.S. Pat. No. 6,819,208 "Electromagnetic linear actuator with position sensor," 2004, in which Peghaire, et al, disclose a ferromagnetic actuator with a ferromagnetic circuit defining an axial travel interval of a ferromagnetic armature for axially driving a rod between two extreme positions in which the armature bears against poles of the ferromagnetic circuit. Resilient return means is provided to hold the valve at rest in a middle position between the extreme positions, and at least one coil is carried by the circuit, enabling the armature to be brought alternately into each of the two extreme positions. The rod carries a radially-magnetized bar of a length not less than the travel distance of the armature, and the housing carries at least one magnetic flux sensor placed in a zone having low exposure to the field created by the coil(s).

Prior Art also recognizes the usefulness of applying resonant sensing elements for measuring physical parameters, such as identifying the type of material, its moisture content, etc. When a material to be measured is placed within an electromagnetic field that is excited in a resonator being fed by an RF or microwave generator, which sweeps through a range of frequencies, the resonant frequency of the resonator shifts in relation to the properties of the material. This shift in resonant frequency can be measured or compared with another frequency, e.g. with the resonant frequency of the same resonator in another mode; see U.S. Pat. No. 3,458,808 issued to Nils Bertil Agdur on Jul. 29, 1969. In this patent, an apparatus for measuring a property of a material comprises, at least: one high frequency sweep-oscillator having a frequency periodically varying in a given range of frequencies, a cavity resonator having two resonant frequency peaks, and indicator means connected to the cavity resonator for producing a signal dependent on the difference of time of occurrence between the two frequency peaks.

When an electromagnetic field is disposed within a volume, it is known that placing a dielectric, conductive, or magnetic material within the volume can alter the parameters of the field. For example, the wave velocity of the electromagnetic field may change. A change in wave velocity leads to a change in phase delay or a change in resonant frequency. Such a change can be measured and utilized to indicate a parameter of the material. The respective influences from a dielectric, conductive, or magnetic material differ, and depend on the distribution of the electric and magnetic fields within a measured volume, see V. A. Viktorov, B. V. Lunkin and A. S. Sovlukov, "Radio-Wave measurements" [in Russian], Moscow: Energoatomizdat, 1989, pp. 148–153.

The application of slow-wave structures according to Prior Art for measuring liquid level and angular position (see patents: U.S. Pat. No. 6,293,142 B1 and U.S. Pat. No. 6,393,912 B2, both by Yu. N. Pchelnikov and D. S. Nyce) teaches the significant decrease of physical dimensions and resonant frequency of a sensing element. In these patents a sensing element, fabricated as a section of a slow-wave structure (SWS), is connected to a measuring circuit comprising an RF oscillator and a converter which converts the resonant frequency of the sensing element SWS into a level reading, in the first example, or to an angular position reading, in the second example.

The use of a SWS sensing element enables the control of electric and magnetic field distribution in the transverse and in the longitudinal directions. The use of coupled slow-wave structures makes it possible to split the electric and magnetic fields in the transverse direction (see Yu. N. Pchelnikov, "Features of Slow Waves and Potentials for Their Nontraditional Application," *Journal of Communications Technology and Electronics*, Vol. 48, #4, 2003, pp. 450–462). Splitting of the electric and magnetic fields can provide additional slowing of the electromagnetic wave. Splitting them in the transverse direction can also enhance the dependence of the electromagnetic field parameters on the distance between the slow-wave structure and a conductive target.

Slowed electromagnetic waves and slow-wave structures are also well known in the field of microwave engineering, see J. R. Pierce, "Traveling-Wave Tubes" D. Van Nostrand Company, Inc., Princeton, N.J., 1950, Dean A. Watkins "Topics in Electromagnetic Theory", John Wiley & Sons, Inc., and "Radio-Wave Elements of Engineering Devices Based on Slow-wave Structures," [in Russian] *Moscow: Radio and Communications,* 2002).

Slow waves are electromagnetic waves propagating in one direction with a phase velocity $v_p$ that is smaller than the velocity of light, c, in vacuum. The ratio $c/v_p$ is called the deceleration factor, or slowing factor. It is designated as N. In most practical applications, slowed electromagnetic waves are formed in slow-wave structures by coiling one or two conductors, for example, into a helix, or radial spiral (Prior Art), which geometrically increases the path length traveled by the wave. Such a curled conductor is called an "impedance conductor". It is commonly paired with another conductor that is not curled, called a "screen conductor".

Additional deceleration, in addition to the geometric path length, can also be obtained due to positive electric and magnetic coupling in a coupled slow-wave structure. In this case, both conductors are coiled, and have the configuration of mirror images flipped by 180° relative to a plane of symmetry, see Yu. N. Pchelnikov, "Comparative Evaluation of the Attenuation in Microwave Elements Based on a Spiral Slow-Wave System", *Soviet Journal of Communication Technology and Electronics*, Vol. 32, #11, 1987, pp. 74–78.

Slow-wave structure-based sensitive elements are known in the art, see V. V. Annenkov, Yu. N. Pchelnikov "Sensitive Elements Based on Slow-Wave Structures" *Measurement Techniques*, Vol. 38, #12, 1995, pp. 1369–1375. Slowing of an electromagnetic wave leads to a reduction in the dimensions of a sensing element for a given resonant frequency.

Thus, by using the advantages of electrodynamic structures, a relatively small sensing element can operate at relatively low frequencies. A lower operating frequency is more convenient to generate, and more convenient for the conversion circuit which produces a desired output signal. An operating frequency can be chosen so that it is low enough to provide the above advantages, but still high enough to provide high accuracy and a high speed of response.

The low electromagnetic losses at relatively low frequencies (a few megahertz (MHz) to tens of MHz) also helps to increase the accuracy and sensitivity of the measurement. In addition, slowing of the electromagnetic wave leads to concentration of the energy in both the transverse and longitudinal directions. This results in an increase in sensitivity, proportional to the slowing factor N, see Yu. N. Pchelnikov, "Nontraditional Application of Surface Electromagnetic Waves" *Abstract Book, First World Congress on Microwave Processing*, 1997, pp. 152–153.

In both the Prior Art and in the present invention, one or more parameters of an electromagnetic field are measured. Some of the Prior Art methods and the present invention use one or two resonators, placed near a movable object of which the position is to be measured. Changes in the position of the movable object result in changes of the electromagnetic parameters of the resonator(s). The resonators are connected to a measuring circuit comprising an RF or microwave signal generator, which is used to excite an electromagnetic field.

Devices according to the Prior Art exhibit several problems that can be overcome by the present invention. Previous methods have low accuracy, sensitivity, and resolution at relatively low frequency, increasing only with a substantial increase in the operating frequency. However, an increase in frequency is accompanied by an increase in electromagnetic losses, such losses limiting the accuracy of the measurement. It is also generally known that a higher operating frequency can increase the cost of the associated electronic circuitry. The previous methods therefore require complex and expensive equipment. Thus, there is a need in the art for an electromagnetic method and apparatus for monitoring position that has greater sensitivity, resolution, and lower cost.

SUMMARY OF THE INVENTION

The present invention employs a sensing element that is configured as a section of a coupled slow-wave structure used as a resonator. The movable object, of which the position is to be measured, is electrically conductive, has at least one electrically conductive surface, or has attached to it an electrically conductive surface or an electrically conductive target. Parameters of the electromagnetic field excited in the sensing element are related to the position of the movable object or target. Measurement of one or more of these electromagnetic parameters provides an indication of position or related motion parameters, such as displacement, direction, speed, velocity, and/or acceleration.

The main advantages of such a sensing element, in comparison to Prior Art, include: relatively low operating frequency, concentration of electromagnetic energy in a small volume, the independence of electromagnetic parameters upon the electronic circuit parameters, and high sensitivity to the position of the measured object or target.

The decrease in frequency is achieved due to the slowing factor. The increase in sensitivity is achieved due to concentration of the electromagnetic energy near the surface of the sensing element, and to shifting of the magnetic field in the region between the sensing element and the conductive surface of the movable object (target).

The direction of motion and its speed or acceleration can be obtained from normal mathematical processing of the measured parameters, such as by differentiation.

The simplicity and inexpensive construction are due to the use of a relatively low operating frequency, which allows the use of printed-circuit techniques and inexpensive electronic components. The high accuracy and resolution are due to the sensing element design: the slow-wave structure-based sensing elements can be fabricated with a temperature-stable dielectric base, contrary to, for example, cavity resonators.

The present invention teaches an electromagnetic method of measuring the position of a movable object, its speed, direction (velocity), acceleration, or other measurements that require high resolution wherein: an excited electromagnetic wave with a preset distribution of the electric and magnetic components of the electromagnetic field makes it possible to increase the sensitivity and accuracy of measurement, using relatively low frequencies. The method is implemented in an apparatus, for example, a linear position sensor, wherein the structural form of the sensing element and the conductive surface (target) of the movable object are adjusted to allow increased sensitivity and accuracy. In the invention, the sensing element includes at least one section of a coupled slow-wave structure which is sensitive to the position of a movable object or target.

DESCRIPTION OF THE DRAWINGS

For further understanding of the nature and objects of the present invention, reference should be made to the following figures in which like parts are given like reference numerals and wherein.

DETAILED DESCRIPTION OF THE PREFERRED EMBODIMENTS OF THE PRESENT INVENTION

Figure 1:
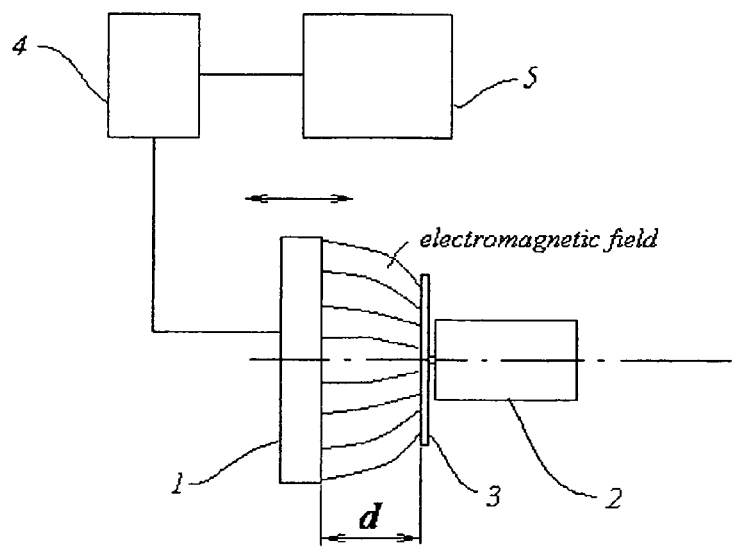
FIG. 1 shows a general schematic of the preferred embodiment of the present invention with a plane sensing element.
Figure 2:
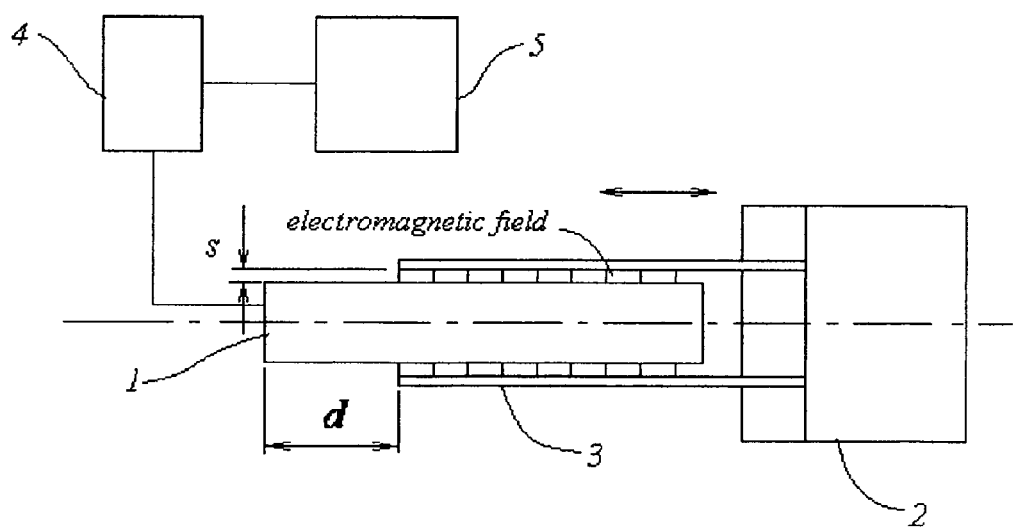
FIG. 2 shows a general schematic of a preferred embodiment of the present invention with a cylindrical sensing element.

According to the present invention, a distance, d, between sensing element 1 and a movable object 2 is measured by exciting an alternating electromagnetic field in sensing element 1, and measuring a corresponding electromagnetic parameter of sensing element 1, acted upon by interaction of the electromagnetic field with conductive target 3 mounted on object 2. (FIG. 1 and FIG. 2). The electromagnetic field is excited by an RF or microwave oscillator 4, connected to sensing element 1 and a measuring circuit 5. Currents and charges excited on the conductive surface of target 3 change the electromagnetic parameters. Such an electromagnetic parameter can be measured as a change in the resonant frequency $f_r$ of sensing element 1, its impedance Z, phase shift Θ, and other electrical measurements. Changes in these parameters depend on distance d, intensity and configuration of the electromagnetic field extending from sensing element 1 to target 3, and also, the surface conductivity of target 3. Sensing element 1 may be configured as a plane as it is shown in FIG. 1, or may have a cylindrical configuration as it is shown in FIG. 2.

To obtain the best results in linear position sensing, an alternating electromagnetic field (preferably a magnetic field) should be concentrated near the surface of sensing element 1. The degree of concentration of the field is proportional to the deceleration, N, which is defined as the ratio of the velocity of light, c, to the phase velocity $v_p$ of the electromagnetic wave in the section of the slow-wave structure being considered. With greater concentration of the field, the sensitivity of the position measurement is increased. Approximately 86% of the energy of a slowed wave on the outside of a slow-wave structure is concentrated within a small layer, having a thickness of approximately $\lambda/2\pi N$, where λ is the wavelength in free space.

Figure 4:
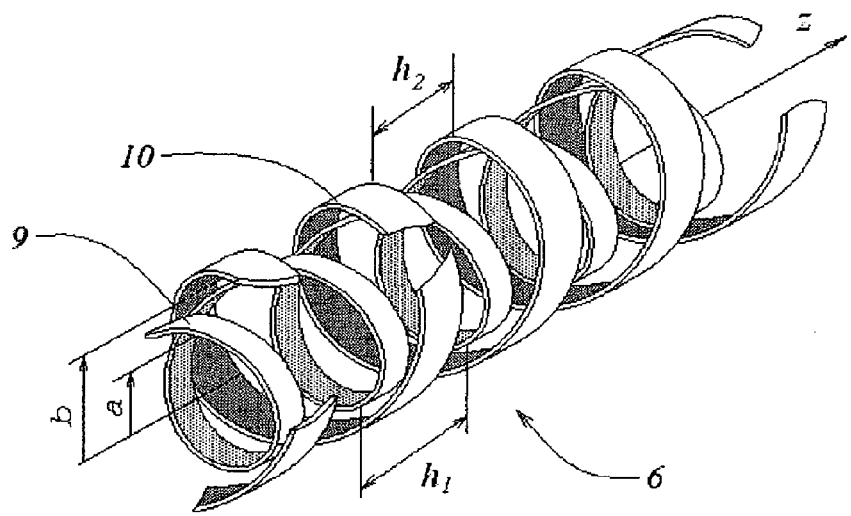
FIG. 4 shows a set of coupled helices with the adjacent conductors of a given helix separated at a pitch h1 or h2.
Figure 5:
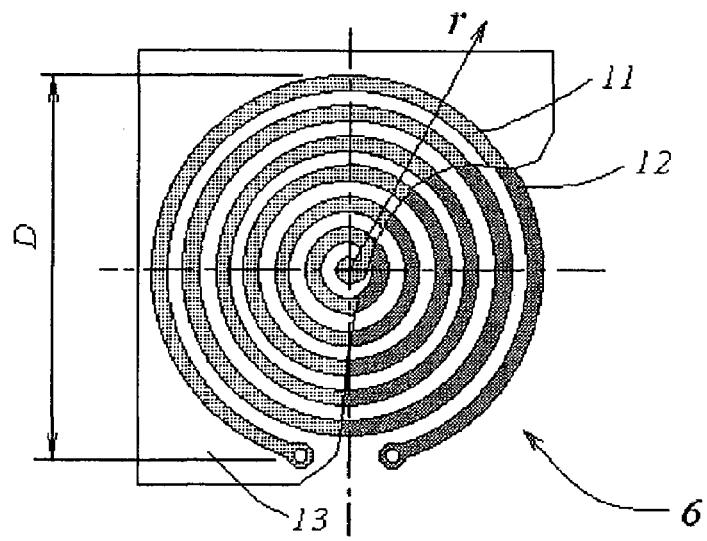
FIG. 5 shows a set of coupled radial spirals.

According to the present invention, an electromagnetic field is excited in the form of an axially symmetric opposite-phase wave in coupled slow-wave structure 6 (FIGS. 4 and 5). By its definition, a coupled slow-wave structure is formed by impedance conductors 7, 8, with a configuration such that the two patterns are mirror images of one another, flipped by 180° with respect to a surface of symmetry (see patent U.S. Pat. No. 6,522,222 B1, "Electromagnetic Delay Line with Improved Impedance Conductor Configuration," issued to Yu. N. Pchelnikov and D. S. Nyce in 2003). In FIG. 4, impedance conductors are formed by coaxial helices 9, 10 with opposite directions of winding. In FIG. 5, they are formed by oppositely wound radial spirals 11, 12, deposited on opposite sides of a dielectric plate 13.

Figure 3:
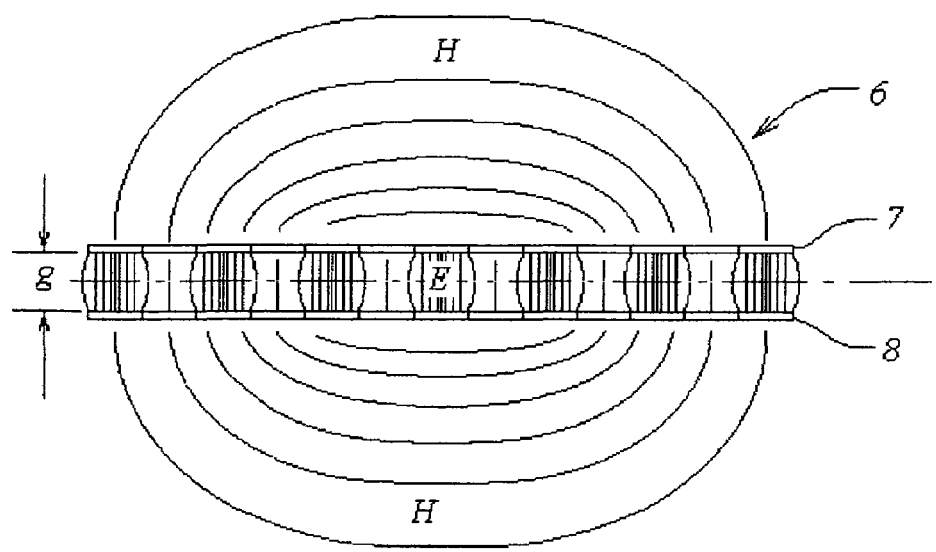
FIG. 3 provides a pictorial representation of the distribution of electric and magnetic fields in a plane coupled slow-wave structure.

The advantage of coupled slow-wave structures as sensing elements can be explained by their two main peculiarities: the splitting of the electromagnetic field into electric and magnetic fields in the transverse direction as it is shown in FIG. 3, and the additional deceleration caused by positive electric and magnetic coupling between the impedance conductors of the coupled slow wave structures.

The splitting of the electric and magnetic fields is accomplished through the use of the mirror-image configuration of the impedance conductor patterns 7, 8, flipped by 180°, and by the opposite-phase wave excitation. To achieve splitting of the field components (electric and magnetic), a gap g between conductors 7 and 8 (FIG. 3) should be chosen $$g < \frac{\lambda}{20\pi N}, \tag{a}$$

where λ is the wavelength of the electromagnetic wave in free space, and N is the deceleration of the electromagnetic wave in the slow-wave structure.

Splitting of the electric and magnetic fields increases the sensitivity to the position of a conductive surface, by a factor of many times. When a common slow-wave structure with one impedance conductor is used for measuring the distance to a conductive surface (target 3), electric charges induced by the electric field on the surface of target 3 increase the equivalent capacitance $C_0$ of the impedance conductor, while the current induced by the magnetic field decreases its equivalent inductance $L_0$. As a result, the sensitivity of such a measurement is relatively small. In the measurement method according to the present invention, opposite currents are excited along the surface of conductive target 3, while electric charges are excited between conductors 7 and 8 of the coupled slow-wave structure 6. As a result, both the equivalent capacitance and the equivalent inductance increase, and the sensitivity is therefore much greater.

Additional deceleration is caused by the opposite winding of one impedance conductor as compared to the other, and by the opposite-phase excitation. In this case, the equivalent capacitance and equivalent inductance increase as the gap g between impedance conductors decreases (see Yu. N. Pchelnikov "Comparative Evaluation of the Attenuation in Microwave Elements Based on a Spiral Slow-Wave System", *Soviet Journal of Communication Technology and Electronics*, Vol. 32, #11, 1987, pp. 74–78).

The increase in deceleration N is followed, as it was mentioned above, by an increase in the electromagnetic field (magnetic field H, mostly) concentration near the sensing element surface and by an increase in the sensitivity. It is known in Prior Art that the deceleration is defined through equivalent parameters as $$N = \sqrt{\frac{L_0 C_0}{\varepsilon_0 \mu_0}}, \tag{b}$$

where $\varepsilon_0$ and $\mu_0$ are the permittivity and permeability, respectively, of free space.

According to the present invention, a change in the position of target 3 causes a change in equivalent inductance $L_0$ and, according to formula (b), a change in deceleration N. A change in deceleration N leads to an inversely proportional change in resonant frequency $f_r$ of sensing element 1, a proportional increase in phase shift Θ, and a proportional increase in wave impedance $Z_0$. Each of these changes can easily be measured by relatively simple electronic circuits.

Figure 6:
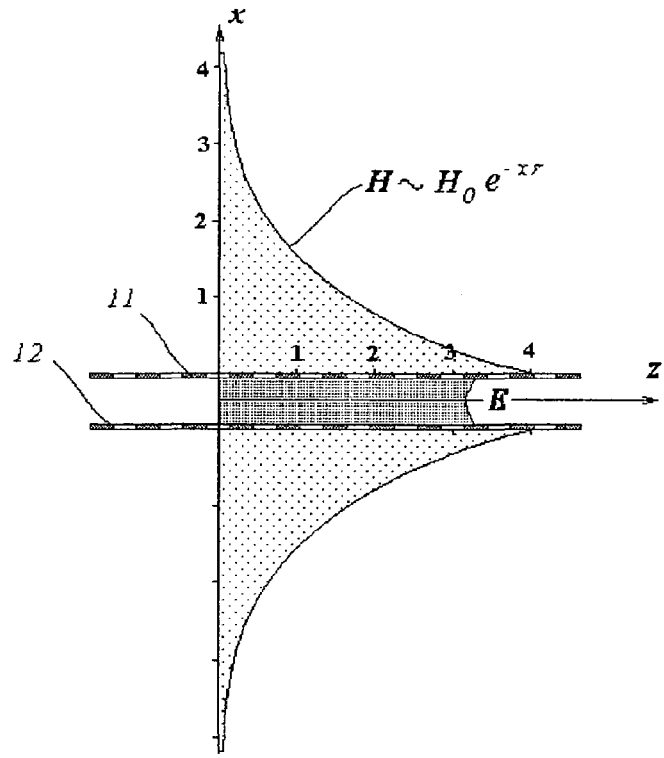
FIG. 6 provides a graphical representation of the electric and magnetic field strength vs. distance from a plane coupled slow-wave structure.
Figure 7:
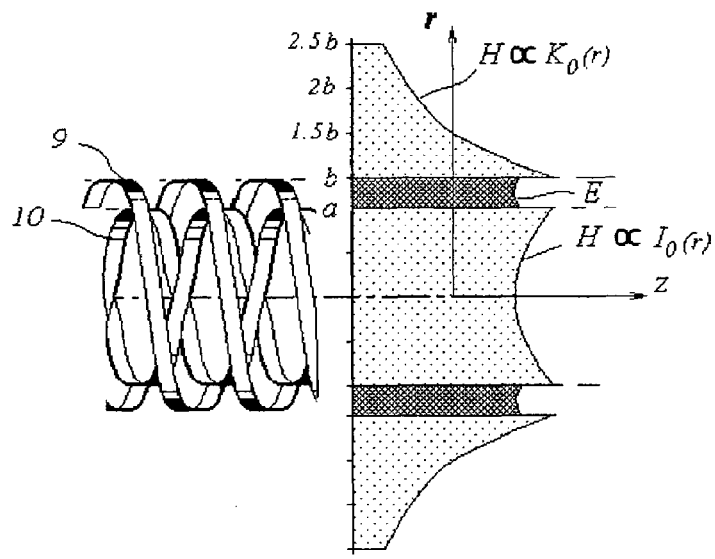
FIG. 7 provides a graphical representation of the electric and magnetic field strength vs. distance from a set of coupled helices.
Figure 8:
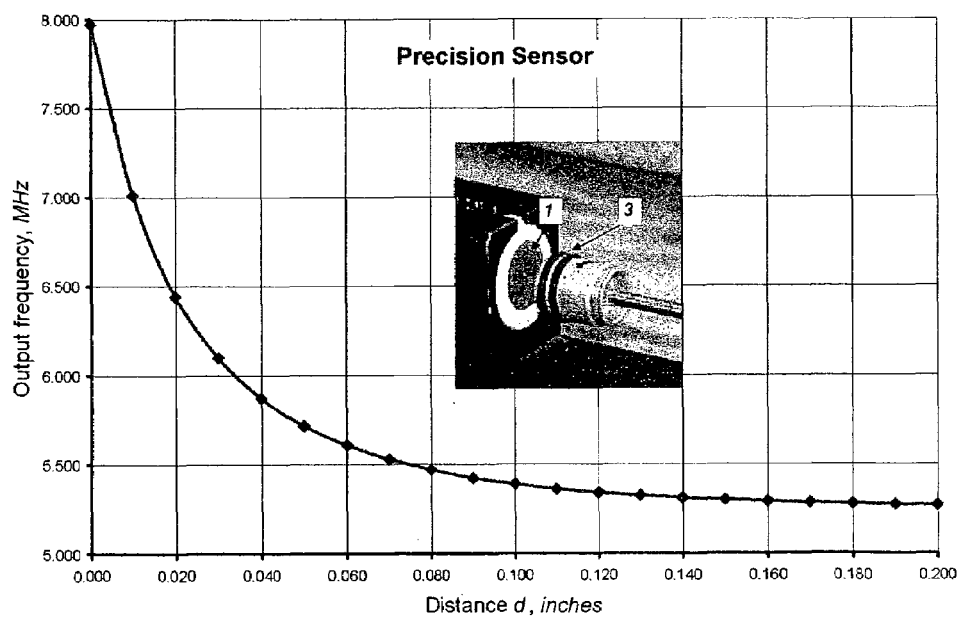
FIG. 8 illustrates a typical frequency dependence upon the distance, d, between the sensing element and target, according to the present invention.

As it follows from Prior Art theory (see L. N. Loshakov, Yu. N. Pchelnikov "Traveling Wave Tube Theory and Amplification Calculation" *Moscow: Radio,* 1964 [in Russian]) and has been confirmed experimentally by the present inventors, the field distribution near a plane slow-wave structure is exponential (FIG. 6). Near a cylindrical slow-wave structure, it is defined by a modified second order Bessel function (FIG. 7). It follows from this that, in the case of a change in the target position along an axis perpendicular to the structure surface, 6, (direction x in FIG. 6), the measured parameter, e.g. the frequency of oscillator 4, changes non-linearly as it is shown in FIG. 8, where the dependence of a Pierce oscillator output frequency on distance, d, to target 3 is shown.

In the case of a cylindrical configuration of sensing element 1, when spacing s between impedance conductor 8 and cylindrical target 3 remains constant, a longitudinal shift of target 3 results in a relatively linear dependence of the measured parameter (as shown in FIG. 4).

According to the present invention, the sensing apparatus can be simplified if the movable object to be measured has a metal wall that can be used as an electrically conductive target. If this conductive wall is plane and perpendicular to the direction of movement, a plane sensing element can be used. If this wall has a cylindrical configuration, a cylindrical sensing element can be used. It is preferable that the geometric configurations of the sensing element 1 and target 3 are similar in shape.

According to the present invention, an opposite-phase electromagnetic wave is excited as an axially symmetric slow wave propagating in the longitudinal direction z (in the case of coupled helices shown in FIG. 4) and in the radial direction r (in case of radial spirals shown in FIG. 5). Due to the axial symmetry of the excited field, a small shift of target 3 in a direction transverse to the desired sensing direction does not cause an error in the position measurement.

To increase the measuring range, the conductive surface of target 3 or object 2, according to some versions of the present invention, can be configured so that the measured motion is in parallel to the surface of the slow-wave structure, 6.

Figure 9:
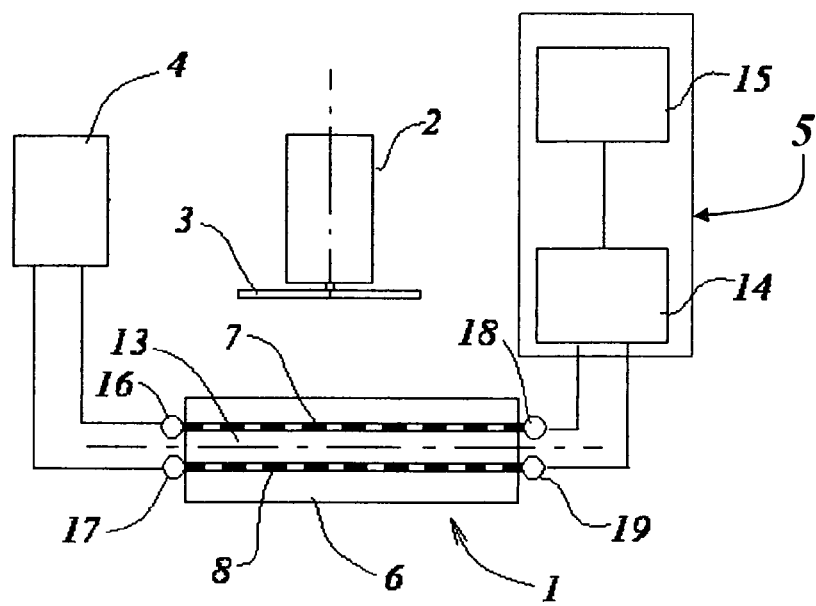
FIG. 9 shows a block diagram according to the present invention, in which sensing element 1 is connected to oscillator 4 and measuring circuit 5.
Figure 10:
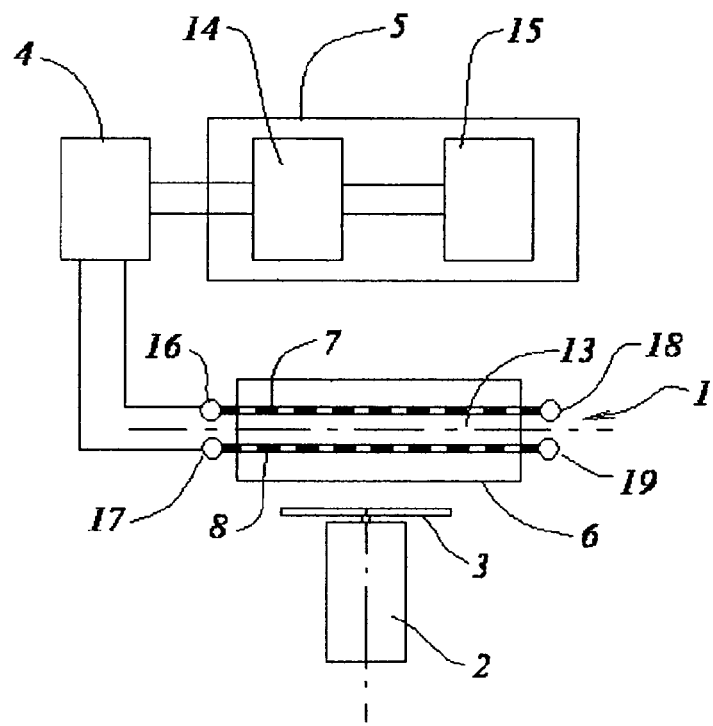
FIG. 10 shows a block diagram according to the present invention, in which sensing element 1 is connected to oscillator 4.

According to a preferred embodiment of the present invention, an apparatus for the measurement of linear position comprises at least one electromagnetic sensing element 1 connected to an RF or microwave oscillator 4 and measuring circuit 5 (through oscillator 4, as in FIG. 10, or straight to circuit 5, as in FIG. 9). Measuring circuit 5 includes at least a first converter, 14, for converting an electromagnetic parameter, such as phase delay or frequency, into an electrical signal, such as a DC (direct current) voltage; and a second converter 15, for converting the electrical signal into a measurement of linear position.

Sensing element 1 is formed by a section of a coupled slow-wave structure, 6, formed by impedance conductors 7 and 8, installed on dielectric base 13. Slow-wave structure 6 is connected by terminals 16, 17 to oscillator 4, while terminals 18, 19 can be open, loaded with an impedance, shorted, or can be connected to measuring circuit 5 as shown in FIG. 9.

Each of the impedance conductors 7, 8 (FIG. 3) are curled into a helix 9, 10 (FIG. 4) or spiral 11, 12 (FIG. 5) with opposing directions of winding. Pitches $h_1$, $h_2$ are chosen to provide the desired distribution of the magnetic field within the distance between sensing element 1 and target 3. In the case of a plate sensing element, $h_1=h_2=h$, approximately, and the maximum operating distance $d_{max}$ can be defined approximately by the following expression:

$$d_{max} \approx \frac{\lambda}{2\pi N}, \quad (c)$$

where $\lambda$ is the wavelength of the electromagnetic wave in free space, and N is the deceleration factor. For coupled spirals having a small gap, g, between impedance conductors, N can be defined approximately as: (see Yu. N. Pchelnikov, "Features of Slow Waves and Potentials for Their Nontraditional Application," *Journal of Communications Technology and Electronics,* Vol. 48, #4, 2003, pp. 450–462)

$$N \approx 2 \cdot \sqrt[3]{\pi \frac{r^2 \lambda}{h^2 g}}, \quad (d)$$

Where r is the radius of the spirals, or the average radius of the helices. In the case of a set of coaxial helices, the spacing, s, between the helices and the cylindrical target should be less than the average radius of the helices.

Figure 11:
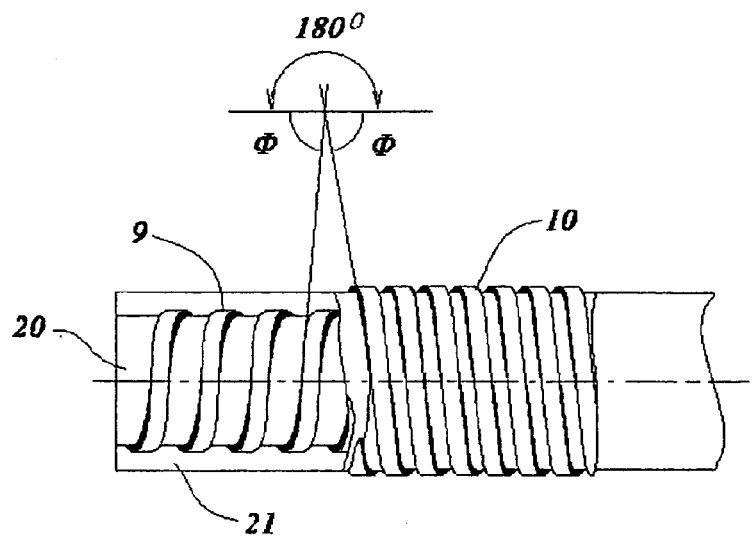
FIG. 11 illustrates a longitudinal section of a preferred embodiment of a cylindrical version of sensing element 1 according to the present invention.

According to the present invention, sensing element 1 can be formed by two coaxially wound helices 9, 10, one being wound on dielectric tube 20, another wound onto a thin dielectric layer 21, at least partly covering helix 9 (FIG. 11).

According to another version of the present invention, sensing element 1 can be formed as a metallization on both sides of dielectric plate 13 (substrate) as shown in FIG. 5. By choosing a temperature stable material for such a substrate, one can provide a measurement with very low temperature sensitivity.

Oscillator 4 excites a sine wave or complex signal in sensing element 1. This signal reflects from the sensing element or passes through it, causing a voltage difference to appear across terminals 16, 17 and terminals 18, 19, the magnitude of which depend on distance d to target 3. A change in distance d therefore leads to a change in the voltage differences, and that in turn leads to a change in at least one parameter of sensing element 1. The parameter of the sensing element that changes, and is measured, can be the impedance, resonant frequency, or phase shift, etc.

Figure 12:
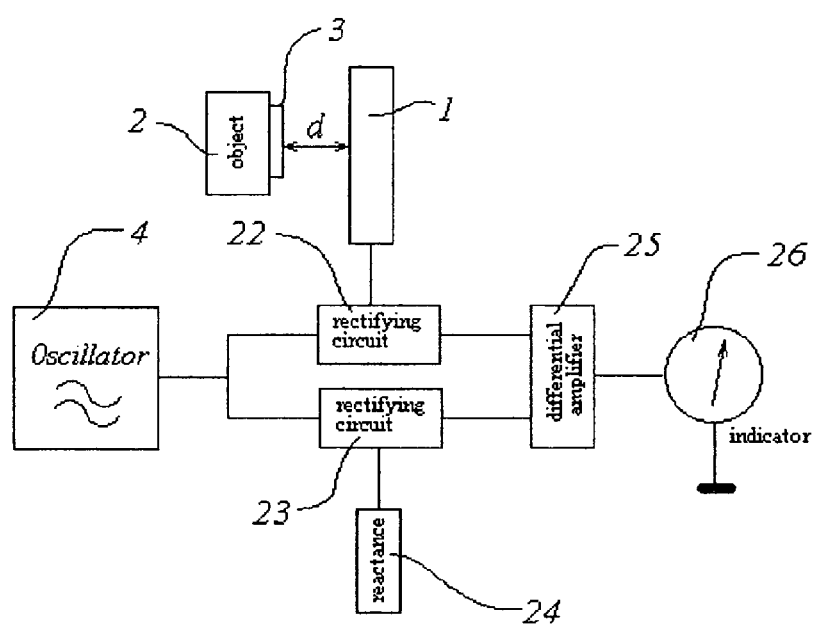
FIG. 12 shows a preferred embodiment of the sensing element driven at a constant frequency according to the present invention.

According to the present invention, the frequency of oscillator 4, $f_{osc}$, can be constant, or it can be variable, depending on the measured parameter and the circuit used. With a constant frequency, the signal from oscillator 4 can be split between paths 22 and 23, of a bridge circuit. Path 22 being loaded by sensing element 1, while path 23 is loaded by a reference load 24 (FIG. 12). The voltage difference between the signals of the two paths is determined and amplified by differential amplifier 25, and can be used to indicate, at indicator 26, a signal depending on the impedance of sensing element 1.

Figure 13:
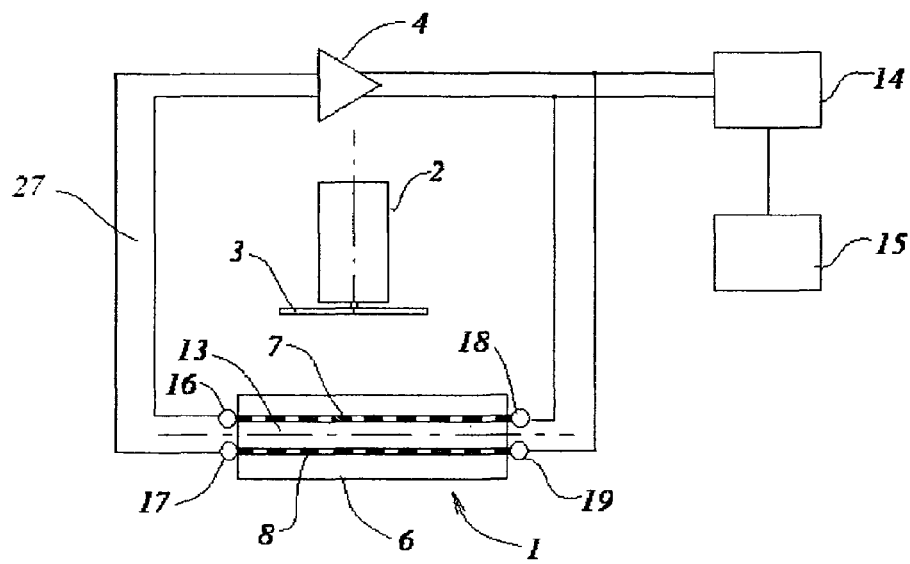
FIG. 13 shows a preferred embodiment of the sensing element operating with a variable frequency according to the present invention.

With variable frequency operation, sensing element 1 is connected in the feedback circuit 27 of oscillator 4, thereby changing its frequency in response to changes in the measured position (FIG. 13). Other measuring circuits can be used for converting the electromagnetic parameters of sensing element 1 into a reading of linear position and related indications. In all versions of measurements according to the present invention, at least one coupled slow-wave structure based sensing element and at least one electrically conductive target 3 are used. In some cases, an electrically conductive surface of object 2 can be used as the target.

Figure 14:
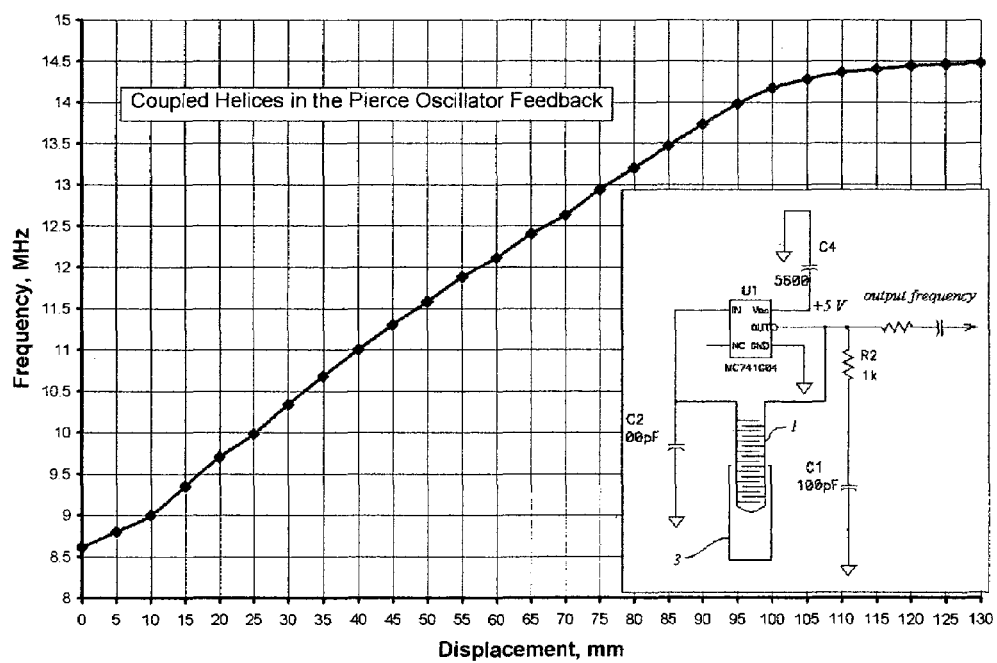
FIG. 14 illustrates an output frequency dependence on position (or distance), d, obtained with cylindrical sensing element 1 in an apparatus according to the present invention.
Figure 15:
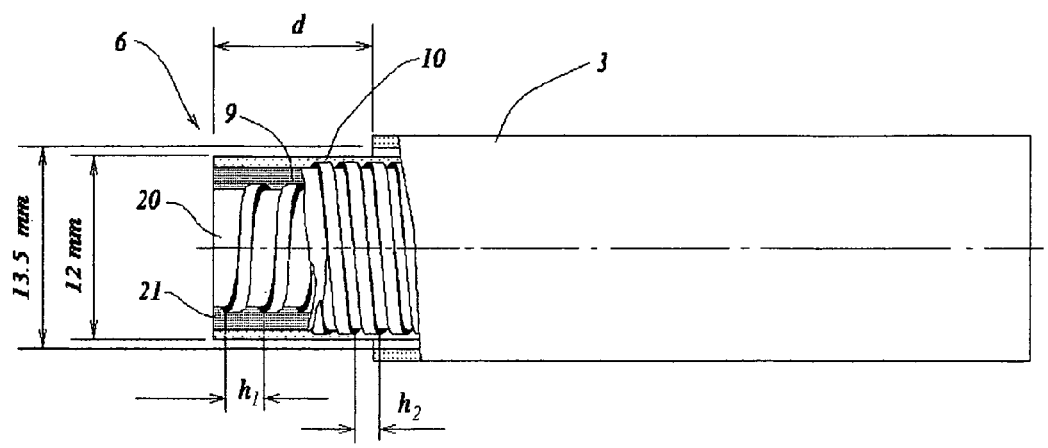
FIG. 15 illustrates an example set of dimensions of sensing element 1, as were used in recording the measurements illustrated in FIG. 14.

FIG. 14 demonstrates the test results of a linear position measurement obtained with a sample apparatus manufactured according to one realization of the present invention. In this version, sensing element 1 is formed by dielectric rod 20 and two coaxial helices. The helices comprise strips of thin copper foil, having a width of 2 mm and pitches of $h_1=4$ mm and $h_2=5$ mm, both wound over a dielectric rod having a diameter of 11 mm (FIG. 15). The external diameter of the completed sensing element 6 is approximately 12 mm. A metal tube with an internal diameter of 13.5 mm was used as the movable target. Sensing element 1 was connected into a feedback circuit of a Pierce oscillator, the operating frequency of which was used to indicate the measured linear position, or measured distance, d. It is seen from FIG. 14 that for d in the range 0–100 mm, the frequency increases approximately proportionally to the linear position. It is seen also that the sensitivity is very high (approximately 56 kHz per millimeter).

We claim:

1. A method for monitoring a position of an object, or related parameters, including a measurement of the position of the object as a distance between the object and a sensing element, motion of the object along the distance defining a motion axis, the method comprising:
    placing at least one electromagnetic sensing element in proximity to the monitored object;
    exciting an alternating electromagnetic field in the sensing element at a frequency and in a form at which the electromagnetic field extends to the object;
    measuring a variation of at least one electromagnetic parameter of the sensing element, the variation caused by a variation in the position of the object;
    converting results of the measurements into a representation of the position of the object along the motion axis,
    wherein
    at least one electrically conductive surface is formed on, or coupled to, the monitored object, the surface facing the sensing element, the alternating electromagnetic field exited as an opposite-phase slowed-wave in a coupled slow wave structure, the electromagnetic field having a spatial distribution, the distribution depending on the position of the conductive surface; and
    providing an indication of the position of the object.

2. The method of claim 1, wherein:
    a metal wall of the monitored object is used as the conductive surface.

3. The method of claim 1, wherein:
    the conductive surface is disposed on a target coupled to the object,
    the target having a physical geometric configuration similar to the sensing element configuration.

4. The method of claim 1, wherein:
    the opposite-phase electromagnetic wave is excited as an axially symmetric slow wave propagating in an axial direction,
    the axial direction substantially parallel with the motion axis, the surface positioned in parallel to the axial direction.

5. The method of claim 1, wherein:
    the opposite-phase slowed-wave is excited as an axially symmetric slowed-wave, propagating in a radial direction,
    the radial direction being perpendicular to the motion axis, the conductive surface positioned in parallel to the radial direction.

6. An apparatus for monitoring a position of an object, including a measurement of the position of the object as a distance between the object and a sensing element, motion of the object along the distance defining a motion axis, the apparatus comprising:
    at least one electromagnetic sensing element;
    at least one target having an electrically conductive surface, the target located proximate the monitored object; and
    a measuring circuit connected to the sensing element, the circuit including:
        at least one radio frequency or microwave generator; and
        a converter convening electromagnetic parameters of the sensing element into an electrical representation of linear position,
    wherein:
    the sensing element including at least one section of a coupled slow-wave structure, the generator exciting a slowed-wave into the sensing element, the slowed wave propagating in a direction, the section of coupled slow-wave structure having at least two impedance conductors configured as patterns, the patterns fashioned as at least one row of conductive members arranged in series in the direction of the slowed wave propagation and connected to one another with a pitch, h; and
    the pattern configurations of the impedance conductors being mirror images of one another flipped by approximately 180 degrees with respect to a surface of symmetry of the patterns, the patterns being set to distribute in a given ratio the components of electric and magnetic fields at the conductive surface of the target.

7. The apparatus according to claim 6, wherein:
    there exists a gap g between the impedance conductors, the slowed-wave having a deceleration in the slow-wave structure and a wave length λ in free space, the gap and wave length of the electromagnetic wave approximately defined by the inequality $$g < \frac{\lambda}{20\pi N},$$

where N is the deceleration of the electromagnetic wave in the slow-wave structure.

8. The apparatus according to claim 6, wherein:
    the impedance conductors are formed by at least two approximately identical radial spirals that are wound in opposite directions.

9. The apparatus according to claim 8, wherein:
    at least two of the radial spirals are formed as metallization on at least two sides of a dielectric substrate.

10. The apparatus according to claim 6, wherein:
    the impedance conductors are formed by at least two coaxially positioned helices that are wound in opposite directions.

11. The apparatus according to claim 10, wherein:
    at least two of the helices are formed as metallization on at least one dielectric tube, through at least one dielectric layer.

* * * * *